(12) United States Patent
Kashiwada et al.

(10) Patent No.: US 6,400,485 B2
(45) Date of Patent: Jun. 4, 2002

(54) AIR-DYNAMIC BEARING APPARATUS AND POLYGON SCANNER MOTOR

(75) Inventors: Tsuyoshi Kashiwada; Kaoru Kaneko; Hirotada Shimaguchi, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/838,889

(22) Filed: Apr. 20, 2001

(30) Foreign Application Priority Data

Apr. 26, 2000 (JP) ......................................... 2000-125443

(51) Int. Cl.$^7$ ............................................. G02B 26/08
(52) U.S. Cl. ......................... 359/200; 359/217; 310/90
(58) Field of Search ............................... 359/196, 198, 359/200, 212, 216, 217, 218, 219, 871; 310/90, 91, 67 R

(56) References Cited

U.S. PATENT DOCUMENTS 5,114,245 A  *  5/1992  Tanaka et al. ............... 384/112
5,280,208 A  *  1/1994  Komura et al. ............... 310/90
6,276,831 B1 *  8/2001  Takahashi et al. ........... 384/100
6,313,967 B1 * 11/2001  Bodmer et al. .......... 360/98.07

* cited by examiner

Primary Examiner—Mark A. Robinson
(74) Attorney, Agent, or Firm—Adams & Wilks

(57) ABSTRACT

To provide an air-dynamic bearing apparatus having a radial dynamic bearing and thrust dynamic bearings by a small number of parts by using a material which is easy to fabricate and a polygon scanner motor using thereof, a rotor 26 made of a metal is supported by a small diameter portion 21A provided at a front end of a stator 21 made of a metal as a shaft portion by using an attaching hole 26A and a thrust plate 8 is fixed to an end portion of the small diameter portion 21A to thereby constitute bearing portions, low friction metal plating layers M1 through M3 are provided to respective bearing faces of the bearing portions, thereby, a radial dynamic bearing 51, a first thrust dynamic bearing 52 and a second thrust dynamic bearing 53 are formed.

6 Claims, 2 Drawing Sheets

AIR-DYNAMIC BEARING APPARATUS AND POLYGON SCANNER MOTOR

BACKGROUND OF THE INVENTION

1. Field of the Invention

The present invention relates to an air-dynamic bearing apparatus and a polygon scanner motor.

2. Description of the Related Art

In an optical system such as a laser beam printer and a digital copier, there is used a polygon scanner motor as means for scanning laser beam. According to a motor apparatus for driving a polygon mirror used for such use, high accuracy and high speed rotation are requested and accordingly, an air-dynamic bearing is widely used as a rotational bearing for supporting a rotor of the motor fixed with the polygon mirror. In an air-dynamic bearing of this kind, a radial bearing portion and a thrust bearing portion are generally formed and to enable to satisfy the above-described request, it is preferable in view of wear resistance that all of parts are constituted by ceramic parts.

However, it is difficult to fabricate a ceramic part having a complicated shape and accordingly, it is necessary to fabricate a desired air-dynamic bearing by integrating ceramic parts each having a simple shape. Therefore, there poses a problem that a number of parts is increased, further, a ceramic part is expensive and therefore, an air-dynamic bearing in which all of parts are constituted by ceramic parts become extremely expensive.

Hence, there has conventionally been proposed an air-dynamic bearing which is inexpensive and is provided with a long service life by using an inexpensive metal material such as aluminum as a material therefor and coating a resin layer on a dynamic face of a metal member fabricated by aluminum to thereby promote wear resistance. However, when the resin coating is used, there poses other problem that it is necessary to refabricate grooves or outer dimensions after coating and the productivity is poor.

In order to resolve the problems, there is disclosed a bearing of a motor in which a shaft member is formed by aluminum or aluminum alloy, a radial dynamic bearing is formed by coating lubricating resin on an outer peripheral face of the shaft member and a thrust bearing is constituted by using a magnet in Japanese Patent Laid-Open No. 219146/1996.

However, according to the bearing disclosed in Japanese Patent Laid-Open No. 219146/1996, the thrust bearing is constituted by using the magnet and therefore, a number of parts is large, time is taken in assembling, the cost is increased and when disturbance is caused in rotating thereof, up and down movement is produced in the axial direction and a reflecting face of a side face of a polygon mirror moves in an up and down direction. Therefore, there poses a problem that influence of mirror face accuracy is liable to be effected and adverse influence is liable to be effected on scanning by laser beam.

SUMMARY OF THE INVENTION

It is an object of the invention to provide an air-dynamic bearing apparatus capable of constituting a radial dynamic bearing and thrust dynamic bearings by a small number of parts by using a metal material which is easy to fabricate and a polygon scanner motor using thereof.

In order to resolve the above-described object, according to an aspect of the invention, there is provided an air-dynamic bearing apparatus for rotatably supporting a rotating member comprising a metal material relatively by a shaft member comprising a metal material, the air-dynamic bearing apparatus comprising a small diameter shaft portion integrally formed with a front end portion of the shaft member for rotatably supporting an attaching hole of the rotating member, and a dynamic pressure generating member fixed to an end portion of the small diameter shaft portion, wherein a radial dynamic bearing is formed between the small diameter shaft portion and an inner peripheral face of the attaching hole, a first thrust dynamic bearing is formed between one end face of the rotating member and a corresponding face of the shaft member, a second thrust dynamic bearing is formed between other end face of the rotating member and a corresponding face of the dynamic pressure generating member and respective dynamic faces of the radial dynamic bearing, the first thrust dynamic bearing and the second thrust dynamic bearing are protected by low friction metal plating layers.

The metal material can be a material easy to fabricate such as aluminum or an aluminum alloy.

The radial dynamic bearing can be constituted by providing a groove for generating dynamic pressure at least at either one side of a dynamic face comprising an outer peripheral face of the small diameter shaft portion and an inner peripheral face of the attaching hole.

The first thrust dynamic bearing can be constituted by providing a groove for generating dynamic pressure at least at either one side of a dynamic face comprising a plane portion of the shaft portion which is brought into contact with a lower end of the small diameter shaft portion and one end face of the rotating member.

The second thrust dynamic bearing can be constituted by providing a groove for generating dynamic pressure at least at either one side of a dynamic face comprising other end face of the rotating member and a corresponding face of a holding member.

According to another aspect of the present invention, there is provided a polygon scanner motor constituted by fixing a polygon mirror formed with a reflecting face for scanning light at a side face thereof to a rotating member comprising a metal material, wherein a rotating member is rotatably supported relatively by a shaft member comprising a metal material on a side of a stator by an air-dynamic bearing apparatus, the air-dynamic bearing apparatus comprising a small diameter shaft portion integrally formed with a front end portion of the shaft member for rotatably supporting an attaching hole of the rotating member, and a dynamic pressure generating member fixed to an end portion of the small diameter shaft portion, a radial dynamic bearing is formed between the small diameter shaft portion and an inner peripheral face of the attaching hole, a first thrust dynamic bearing is formed between one end face of the rotating member and a corresponding face of the shaft member, a second thrust dynamic bearing is formed between other end face of the rotating member and a corresponding face of the dynamic pressure generating member and respective dynamic faces of the radial dynamic bearing, the first thrust dynamic bearing and the second thrust dynamic bearing are protected by low friction metal plating layers.

DETAILED DESCRIPTION OF THE PREFERRED EMBODIMENTS

A detailed explanation will be given of an example of embodiments according to the invention in reference to the drawings as follows.

Figure 1:
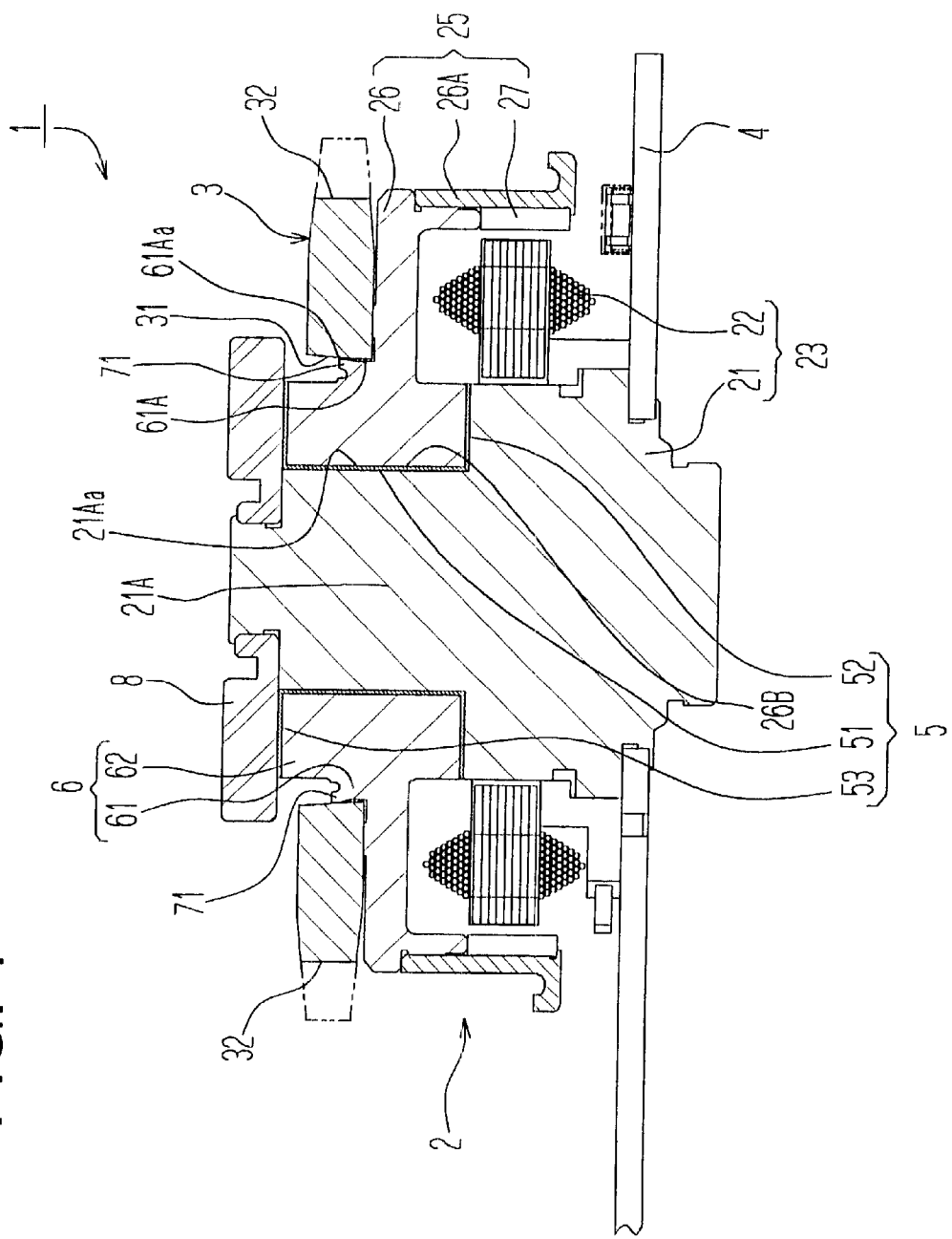
FIG. 1 is a vertical sectional view showing an example of embodiments of a polygon scanner motor according to the invention.

FIG. 1 is a vertical sectional view showing an example of embodiments of a polygon scanner motor according to the invention and according to the embodiment, there is shown an example of a polygon scanner motor used in a laser beam printer.

A polygon scanner motor 1 is constituted to drive to rotate a polygon mirror 3 by a direct current motor 2 of a brushless type and the direct current motor 2 is fixed to a base member 4.

The direct current motor 2 is provided with a stator portion 23 constituted by fixing a winding coil 22 to a stator 21 fixed to the base member 4 by pertinent means at a predetermined position and a rotor portion 25 is rotatably supported by the stator 21 via an air-dynamic bearing apparatus 5 according to the invention.

The rotor portion 25 is constituted by fixing a magnet 27 in a ring-like shape to an inner side of a skirt portion 26A comprising a magnetic material fixed to an outer periphery of a rotor 26 and is constituted such that the rotor 26 is rotated by force operated between a magnetic field produced by drive current which is made to flow to the winding coil 22 and a magnetic field produced by the magnet 27.

The polygon mirror 3 is a hexagonal member in a shape of a thin plate comprising aluminum and is formed with an attaching hole 31 in a circular shape at a central portion thereof. Further, there is formed a reflecting face 32 having a mirror face accuracy of submicron order for reflecting laser beam at a side face of the polygon mirror 3. Further, the shape of the polygon mirror 3 is not limited to the hexagonal shape but the shape may be other shape so far as the shape is a regular polygonal shape.

The rotor 26 is integrally formed with a projected portion 6 in a ring-like shape for fitting to the attaching hole 31 to be fixed to the rotor 26 by using the attaching hole 31.

According to the embodiment, the projected portion 6 is coaxially formed with a large diameter portion 61 having an outer diameter dimension substantially in correspondence with the attaching hole 31 and a small diameter portion 62 integrally continuous to the large diameter portion 61 and an outer peripheral face of the large diameter portion 61 constitutes a fitting face 61A fitted to the attaching hole 31.

When the polygon mirror 3 is fitted to the projected portion 6 of the rotor 26 to thereby constitute a predetermined attaching state shown by FIG. 1, a fitting face end edge 61Aa of the fitting face 61A is opposed to a vicinity of a center in the axial line direction of an inner peripheral face 31A of the attaching hole 31. The large diameter portion 61 is formed with a plurality of plastically deformed portions 71 constituted by pressing the inner peripheral face 31A of the attaching hole 31 toward an outer side in the diameter direction at a plurality of locations along the fitting face end edge 61Aa, at equal angular intervals, in order to bond the polygon mirror 3 and the projected portion 6. In this case, both of the polygon mirror 3 and the rotor 26 are made of aluminum and accordingly, the linear expansion coefficients of the both members are equal to each other and therefore, the state of bonding the both members is not changed by a change in temperature.

In order to fit the rotor portion 25 rotatably to the stator portion 23, there is constructed a constitution in which a front end portion of the stator 21 is integrally formed with a small diameter portion 21A for fitting to an attaching hole 26B of the rotor 26 and by fitting the attaching hole 26B of the rotor 26 to the small diameter portion 21A, the rotor 26 is rotatably supported by the stator 21. Further, a thrust plate 8 as a member for generating dynamic pressure is fixed to a front end of the small diameter portion 21A by calking, thereby, movement of the rotor 26 in the thrust direction is restricted.

Figure 2:
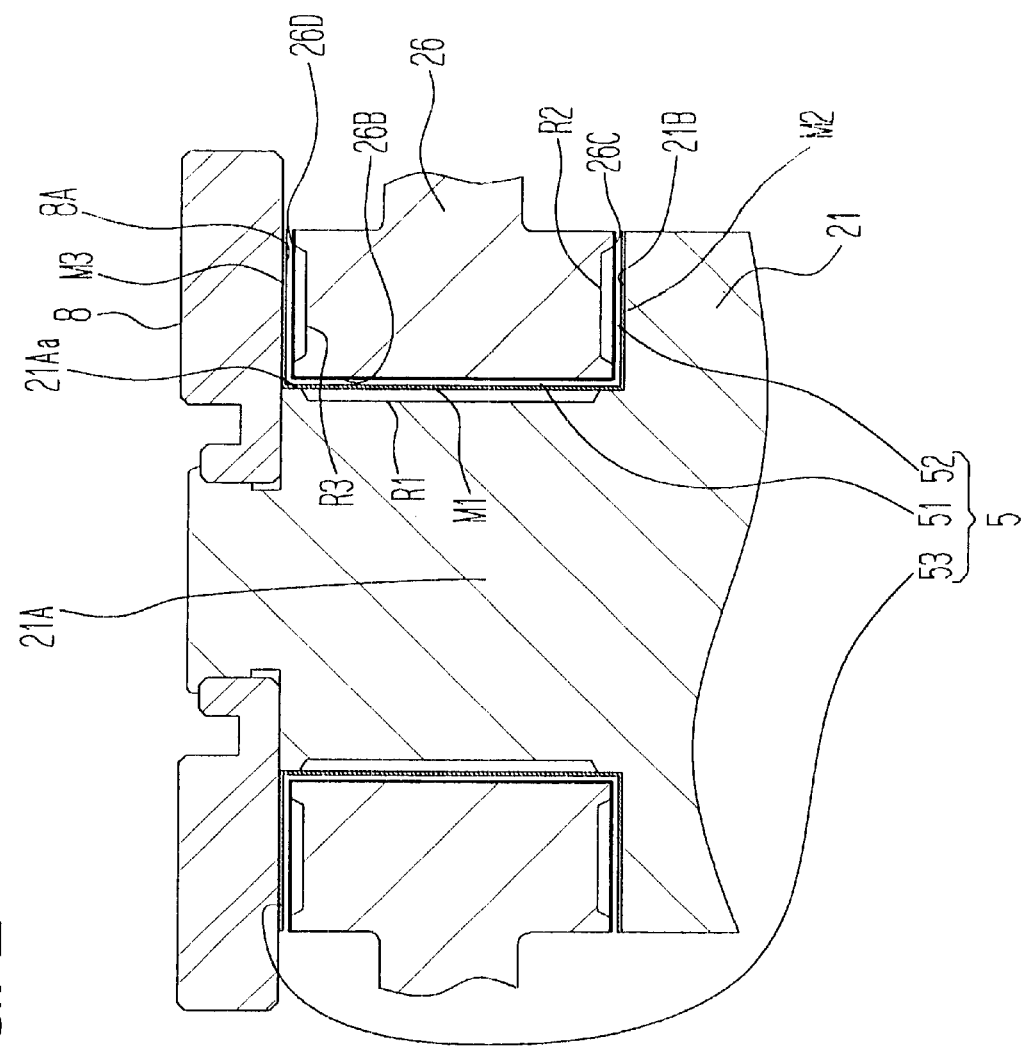
FIG. 2 is an enlarged detail view showing to enlarge an air-dynamic bearing apparatus shown in FIG. 1 in details.

Next, an explanation will be given of an air-dynamic bearing apparatus 5 in reference to FIG. 2. In the polygon scanner motor 1 constituted as described above, the air-dynamic bearing apparatus 5 is for enabling the rotor 26 to rotate at high speed smoothly and stably centering on the small diameter portion 21A by dynamic pressure operation and is constituted by providing a radial dynamic bearing 51, a first thrust dynamic bearing 52 and a second thrust dynamic bearing 53.

The radial dynamic bearing 51 is constituted between an outer peripheral face 21Aa of the small diameter portion 21A and the rotor 26B and is constituted such that according to the embodiment, a dynamic pressure generating groove R1 is formed at the outer peripheral face 21Aa, thereby, when the small diameter portion 21A and the rotor 26 are rotated relatively to each other, predetermined dynamic pressure can be generated in the radial direction. Further, although in FIG. 2, respective gaps for constituting the air-dynamic bearing apparatus 5 are shown to be wide by exaggeration for convenience of explanation, actually, there are constituted gaps of about several micrometers.

The first thrust dynamic bearing 52 is formed between a lower face 26C of the rotor 26 and a horizontal face 21B of the stator 21 opposed thereto and according to the embodiment, the lower face 26c is formed with a dynamic pressure generating groove R2. In this case, the horizontal face 21B is a plane which is brought into contact with a lower end of the small diameter portion 21A formed at the stator 21 at right angle.

The second thrust dynamic bearing 53 is formed between an upper face 26D of the rotor 26 and a lower face 8A of the thrust plate 8 opposed thereto and according to the embodiment, the upper face 26D is formed with a dynamic pressure generating groove R3.

All of the stator 21, the rotor 26 and the thrust plate 8 are made of aluminum or aluminum alloy which is a metal material easy to fabricate and dynamic faces of the respective portions are formed with low friction metal plating layers M1 through M3 in order to ensure sliding performance and friction resistance of the dynamic faces of the members.

The low friction metal plating layer M1 covers the outer peripheral face 21Aa and the horizontal face 21B of the stator 21, the low friction metal plating layer M2 covers the attaching hole 26B, the lower face 26C of the rotor 26 and the upper face 26D of the rotor 26 and the low friction metal plating layer M3 covers the lower face 8A of the thrust plate 8.

Therefore, according to the low friction metal plating layers M1 through M3, thicknesses of plating layers can be controlled comparatively excellently in a plating step and accordingly, the respective parts can be finished to dimensions as designed, a dimension finishing step after plating is not needed and accordingly, a reduction in cost can be expected.

The radial dynamic bearing 51 is constituted as described above and accordingly, a number of parts is comparatively small, fabrication thereof is facilitated since aluminum or aluminum alloy is used and assembling thereof is simple. Therefore, the reduction in cost can be achieved. Further, since all of the radial dynamic bearing and the thrust bearings are air-dynamic bearings, the rotor 26 can be rotated stably and at high speed, movement of the rotor 26 in the axial direction in rotating thereof can extremely be reduced and accordingly, laser beam can stably be impinged to a predetermined portion of the reflecting face 32 of the polygon mirror 3. As a result, quality of scanning light can be promoted.

Further, the respective dynamic faces are protected by plating and accordingly, not only predetermined durability can be ensured but also dimensions of the respective parts can be made desired values by carrying out a thickness control in the plating processing as described above and the dimension finishing step can be dispensed with and accordingly, a number of steps can be reduced and the reduction in cost can be achieved.

According to the invention, as described above, the air-dynamic bearing apparatus is constituted by a smaller number of parts by using the metal material which is fabricated comparatively easily, the low friction plating layer is provided at the dynamic bearing face and accordingly, fabrication thereof is facilitated and assembling is simple. Therefore, the reduction in cost can be achieved. Further, the respective dynamic faces are protected by plating and accordingly, not only predetermined durability can be ensured but also dimensions of the respective parts can be made desired values by carrying out the thickness control in the plating processing as described above and the dimension finishing step can be dispensed with and accordingly, a number of steps can be reduced and the reduction in cost can be achieved.

When the polygon scanner motor is constituted by using the air-dynamic bearing apparatus, all of the radial dynamic bearing and the thrust bearings are constituted by the air-dynamic bearings, the rotor can be rotated stably and at high speed, the movement of the rotor in the axial direction in rotating thereof can extremely be reduced and accordingly, laser beam can stably be made to impinge to a predetermined portion of the reflecting face of the polygon mirror. As a result, the quality of scanning light can be promoted.

What is claimed is:

1. An air-dynamic bearing apparatus comprising:

a shaft member comprising a metal material;

a small diameter shaft portion integrally formed with a front end portion of the shaft member;

a rotating member comprising a metal material and having an attaching hole and being rotatably supported by the small diameter shaft portion; and a dynamic pressure generating member fixed to an end portion of the small diameter shaft portion;

wherein a radial dynamic bearing is formed between the small diameter shaft portion and an inner peripheral face of the attaching hole, a first thrust dynamic bearing is formed between one end face of the rotating member and a corresponding face of the shaft member, a second thrust dynamic bearing is formed between other end face of the rotating member and a corresponding face of the dynamic pressure generating member and metal plating layers are provided to respective dynamic faces of the radial dynamic bearing, the first thrust dynamic bearing and the second thrust dynamic bearing.

2. The air-dynamic bearing apparatus according to claim 1;

wherein the metal material is aluminum or an aluminum alloy.

3. The air-dynamic bearing apparatus according to claim 1;

wherein the radial dynamic bearing is constituted by providing a groove for generating dynamic pressure at least at either one side of a dynamic face comprising an outer peripheral face of the small diameter shaft portion and an inner peripheral face of the attaching hole.

4. The air-dynamic bearing apparatus according to claim 1;

wherein the first thrust dynamic bearing is constituted by providing a groove for generating dynamic pressure at least at either one side of a dynamic face comprising a plane portion of the shaft portion which is brought into contact with a lower end of the small diameter shaft portion and one end face of the rotating member.

5. The air-dynamic bearing apparatus according to claim 1;

wherein the second thrust dynamic bearing is constituted by providing a groove for generating dynamic pressure at least at either one side of a dynamic face comprising other end face of the rotating member and a corresponding face of the dynamic pressure generating member.

6. A polygon scanner motor comprising:

a shaft member comprising a metal material;

a small diameter shaft portion integrally formed with a front end portion of the shaft member;

a rotating member comprising a metal material and having an attaching hole and being rotatably supported by the small diameter shaft portion;

a polygon mirror fixed to the rotating member and formed with a reflecting face for scanning light at a side face thereof; and a dynamic pressure generating member fixed to an end portion of the small diameter shaft portion;

wherein a radial dynamic bearing is formed between the small diameter shaft portion and an inner peripheral face of the attaching hole, a first thrust dynamic bearing is formed between one end face of the rotating member and a corresponding face of the shaft member, a second thrust dynamic bearing is formed between other end face of the rotating member and a corresponding face of the dynamic pressure generating member and metal plating layers are provided to respective dynamic faces of the radial dynamic bearing, the first thrust dynamic bearing and the second thrust dynamic bearing.

* * * * *